Feb. 18, 1958 A. F. MEYER 2,823,647
VALVE SYSTEM AND APPARATUS FOR CONTROLLING
FLUID ACTUATED SERVOMOTOR
Filed March 11, 1954 7 Sheets-Sheet 1

INVENTOR.
ADOLPH F. MEYER
BY
Braddock and Braddock
ATTORNEYS

Feb. 18, 1958  A. F. MEYER  2,823,647
VALVE SYSTEM AND APPARATUS FOR CONTROLLING
FLUID ACTUATED SERVOMOTOR
Filed March 11, 1954  7 Sheets-Sheet 2

INVENTOR.
ADOLPH F. MEYER
BY
Braddock and Braddock
ATTORNEYS

Feb. 18, 1958  A. F. MEYER  2,823,647
VALVE SYSTEM AND APPARATUS FOR CONTROLLING
FLUID ACTUATED SERVOMOTOR
Filed March 11, 1954  7 Sheets-Sheet 3

INVENTOR.
ADOLPH F. MEYER
BY
Braddock and Braddock
ATTORNEYS

Feb. 18, 1958            A. F. MEYER            2,823,647
VALVE SYSTEM AND APPARATUS FOR CONTROLLING
FLUID ACTUATED SERVOMOTOR Filed March 11, 1954            7 Sheets-Sheet 4

INVENTOR.
ADOLPH F. MEYER
BY
Braddock and Braddock
ATTORNEYS

Feb. 18, 1958   A. F. MEYER   2,823,647
VALVE SYSTEM AND APPARATUS FOR CONTROLLING
FLUID ACTUATED SERVOMOTOR
Filed March 11, 1954   7 Sheets-Sheet 6

INVENTOR.
ADOLPH F. MEYER
BY
Braddock and Braddock
ATTORNEYS

Feb. 18, 1958 A. F. MEYER 2,823,647
VALVE SYSTEM AND APPARATUS FOR CONTROLLING
FLUID ACTUATED SERVOMOTOR
Filed March 11, 1954 7 Sheets-Sheet 7

INVENTOR.
ADOLPH F. MEYER
BY
Braddock and Braddock
ATTORNEYS

United States Patent Office 2,823,647
Patented Feb. 18, 1958

2,823,647

VALVE SYSTEM AND APPARATUS FOR CONTROLLING FLUID ACTUATED SERVOMOTOR

Adolph F. Meyer, St. Paul, Minn.

Application March 11, 1954, Serial No. 415,595

12 Claims. (Cl. 121—38)

This invention has relation to a system and apparatus for controlling grinders such as those used in the production of paper pulp from pieces of wood. In grinders of this type, a supply of wood to be ground is placed in a pocket which is open to the circumference of a rotating grinding wheel; and a hydraulic piston, operative in a cylinder, is used to power a ram to force wood in this pocket against the grinding wheel to the end that it be ground into pulp. A plurality of these pockets are located adjacent grinding wheels driven from a common power source.

In order to secure the best speed control of grinders driven by water wheels and the best load control of grinders driven by motors, the hydraulic grinding pressure used in the cylinder when grinding is taking place need be very closely regulated by some means such as an hydraulically operated governor. The details of such a governor and of the method of its operation form no part of the present invention. In order to be effective within very close limits, the rate of delivery of liquid at regulated pressure from said governor is relatively slow. This is entirely satisfactory during the grinding cycle of operation because the movement of the piston and ram as the wood is being ground is relatively slow.

In order to reload when the wood has been ground into pulp, it is necessary that the ram be backed off from the wheel so that a new supply of wood can be introduced into the pocket. It is then necessary that the ram be moved up to cause this wood to be brought into grinding position between said ram and the grinding wheel. It is advantageous that these "backing-off" and "moving-up" operations be accomplished with a minimum of time loss. In practice of the present invention, a source of liquid under pressure, such as the source supplying unregulated pressure to the governor, is used to supply the high volume needed to perform these operations at a rapid rate. This pressure can be any pressure and may be a relatively low pressure. In the remainder of the specification, it will be referred to as the fast-travel pressure. The apparatus of the invention will cause the regulated grinding pressure to be cut off and will introduce the high volume, unregulated, fast-travel pressure into the cylinder to cause the ram to be rapidly backed off when the operator moves a control lever to a "backing-off" position. After a new supply of wood has been placed into the pocket and the operator has moved said control handle to a "moving-up" position, the apparatus of the invention will become operative to cause the fast-travel pressure to be introduced into the cylinder on the opposite side of the hydraulic piston to force the ram rapidly up toward the grinding wheel. As the ram forces the wood against the grinding wheel, the pressure against the hydraulic piston will increase due to the resistance to the movement of the ram offered by the wood. When this pressure reaches a predetermined value, the apparatus will automatically shut off this fast-travel pressure to the cylinder and will open said cylinder to the regulated grinding pressure to begin the regular grinding operation of the apparatus.

Referring to the drawings and the numerals of reference thereon, a grinding wheel 20 is fixedly mounted on shaft 21 for rotation by motor 22. A pocket 23 is fixedly supported to be adjacent and in clearing relation to said grinding wheel 20 and a wood bin 24 is mounted above and is open into said pocket. A sliding door 25 can be moved to position alternately clear of and closing said opening from said bin to said pocket. A ram 26 is slidably mounted in the pocket 23 and a ram rod 27 extends outwardly of the pocket and into a cylinder 28 where it is attached to a hydraulic piston 29.

Figure 13:
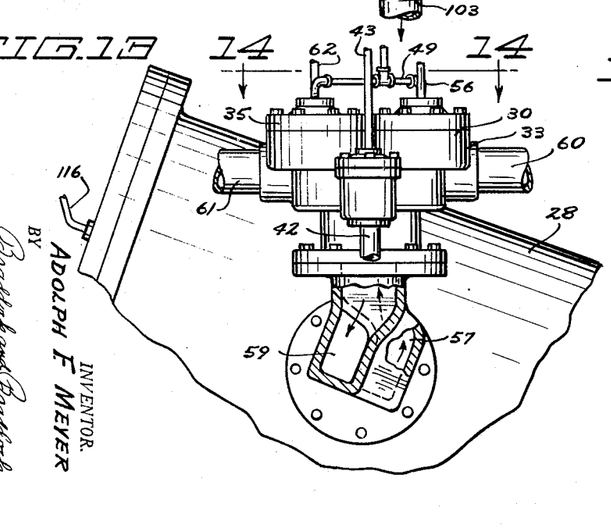
Fig. 13 is a side elevational view of a fragment of a cylinder of the grinder and of a grinder valve mounted thereon, parts being in section and parts being broken away.
Figure 17:
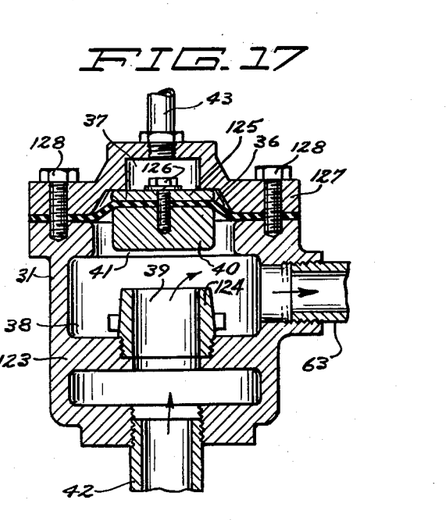
Fig. 17 is an enlarged vertical sectional view taken on line 17—17 in Fig. 14.

A grinder valve or grinder valve assembly 30 is fixedly mounted with respect to the cylinder 28 as best seen in Fig. 13. Said grinder valve controls the flow of liquid under pressure into and out of the cylinder 28 to accomplish grinding, backing off, and moving up action of the ram 26 in the pocket 23. Grinder valve 30 includes five interconnected valves 31, 32, 33, 34 and 35. As best seen in Fig. 17, valve 31 includes a flexible diaphragm 36, a hollowed out control chamber 37 above and a hollowed out flow chamber 38 below said diaphragm. A valve port 39 opens into a central portion of the flow chamber 38, and a valve shoe 40 is supported on the diaphragm 36 to have a valve face 41 in sealing alinement with said valve port 39. A flow pipe 42, from a source of liquid under regulated grinding pressure (not shown), opens to the valve port 39 from outside of the flow chamber 38, while a control pipe 43 opens into the control chamber 37.

Figure 15:
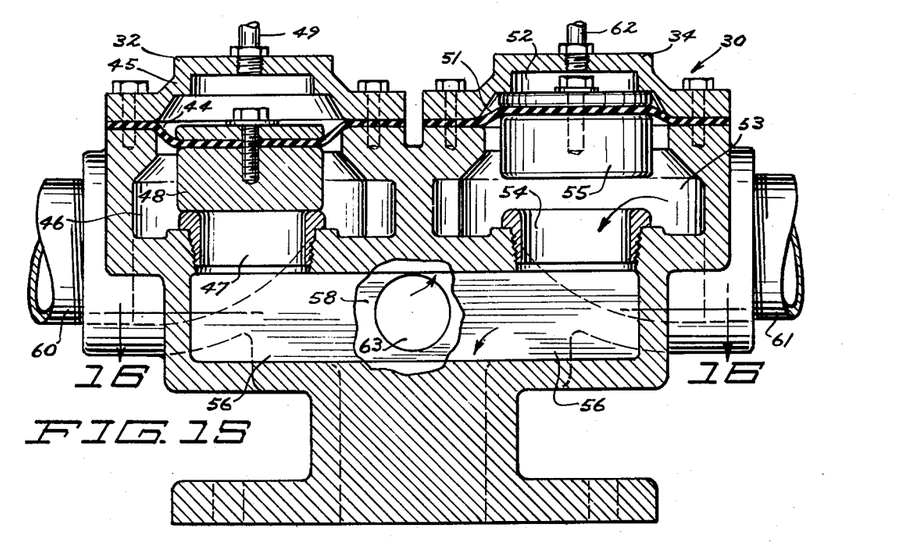
Fig. 15 is an enlarged vertical view taken on line 15—15 of Fig. 14.
Figure 16:
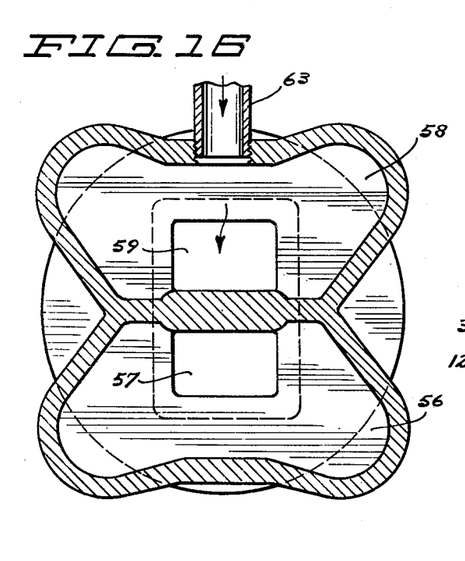
Fig. 16 is a reduced horizontal sectional view taken on line 16—16 in Fig. 15.

As best seen in Fig. 15, valve 32 includes a flexible diaphragm 44, a hollowed out control chamber 45 above and a hollowed out flow chamber 46 below said diaphragm. A valve port 47 opens into a central portion of flow chamber 46, and a valve shoe 48 is supported on the diaphragm 44 to be in sealing alinement with said valve port 47. A control pipe 49 opens into the control chamber 45.

Valve 33 also includes a flexible diaphragm, a hollowed out control chamber above and a hollowed out flow chamber below said diaphragm, a valve port opening into a central portion of the flow chamber and a valve shoe supported on the diaphragm to be in sealing alinement with the valve port. A control pipe 50 opens into the control chamber of the valve 33. Since the construction of the valve 33 is exactly the same as the construction of valves 31 and 32 with the exception of the shape of the flow chambers, a cross sectional view of valve 33 is not pictured in the drawings.

As best seen in Fig. 15, valve 34 includes a flexible diaphragm 51, a hollowed out control chamber 52 above and a hollowed out flow chamber 53 below said diaphragm. A valve port 54 opens into a central portion of the flow chamber 53, and a valve shoe 55 is supported on the diaphragm 51 in sealing alinement with said valve port 54. A passageway 56 opens to the valve port 54 of the valve 34 and the valve port 47 of the valve 32 from outside of the flow chambers 46 and 53 respectively. This passageway 56 is open to a conduit 57 which opens to the interior of that part of the cylinder 28 between the piston 29 and the ram 26. A control pipe 62 opens to the control chamber 52.

Valve 35 includes a flexible diaphragm, a hollowed out control chamber above and a hollowed out flow chamber below said diaphragm, a valve port opening into a central portion of the flow chamber and a valve shoe supported on the diaphragm to be in sealing alinement with the valve port. The control pipe 49 opens into the control chamber of the valve 35. Since the construction of valve 35 is exactly the same as the construction of the valves 31, 32, 33 and 34 except for the shape of the flow chamber, a cross sectional view of valve 35 is not included with the drawings.

A passageway 58 opens to the valve port of the valve 33 and to the valve port of the valve 35 from outside of the flow chambers of these valves. This passageway 58 is open to a conduit 59 which opens to the interior of that part of the cylinder 28 on the opposite side of the piston 29 from the ram 26.

A flow pipe 60, from a source which can supply liquid under pressure at a rapid rate (not shown) opens into the flow chamber 46 of the valve 32 and the flow chamber of the valve 33. A flow pipe 61 is open from the flow chamber 53 of the valve 34 and the flow chamber of the valve 35 to exhaust or drain. A passageway 63 opens from the flow chamber 38 of the valve 31 to the passageway 58.

Figure 1:
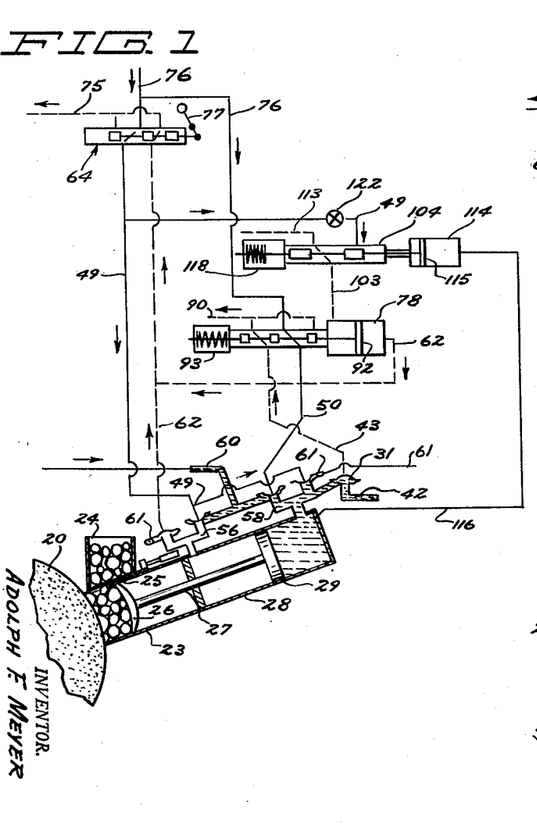
Fig. 1 is a diagrammatic representation of a grinder control system and apparatus of the present invention disclosing the relative positioning of the parts when the grinder is in grinding operation.
Figure 2:
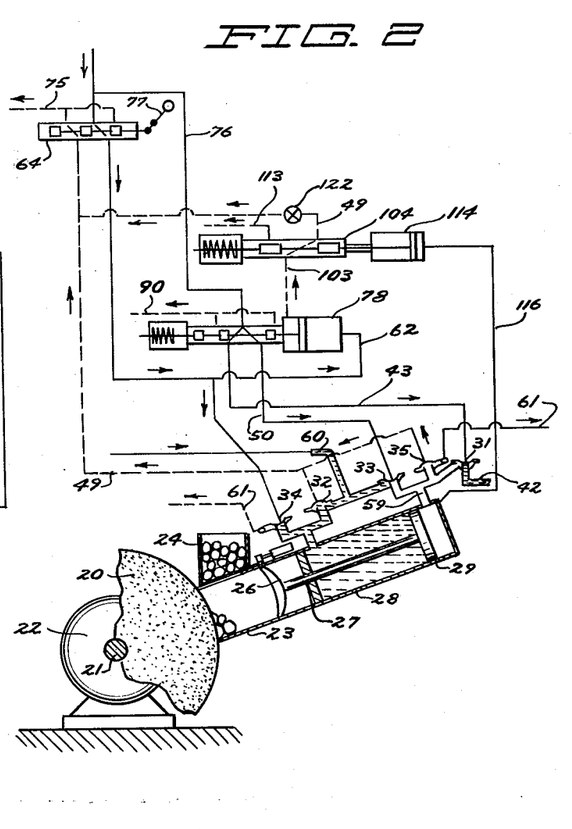
Fig. 2 is a diagrammatic representation of the control system and apparatus showing the relative positioning of the parts when the ram is being backed off from the grinding wheel.
Figure 3:
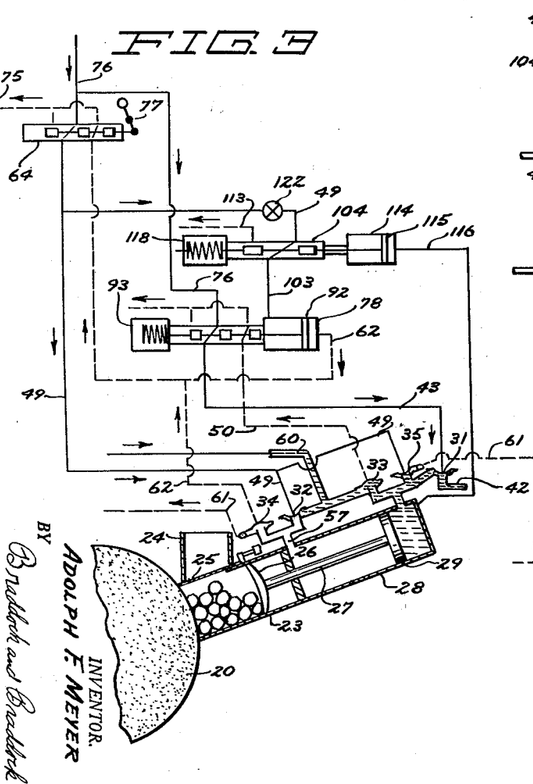
Fig. 3 is a diagrammatic representation of the system and apparatus showing the relative positioning of the parts when the ram is being moved up toward the grinding wheel.
Figure 4:
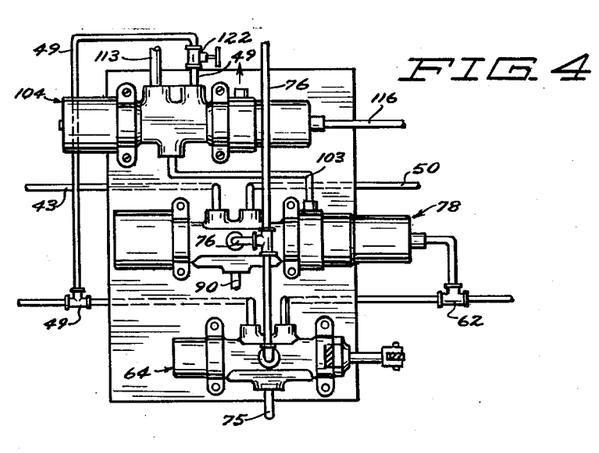
Fig. 4 is a top plan view of an operating stand and of the control valves of the apparatus.
Figure 14:
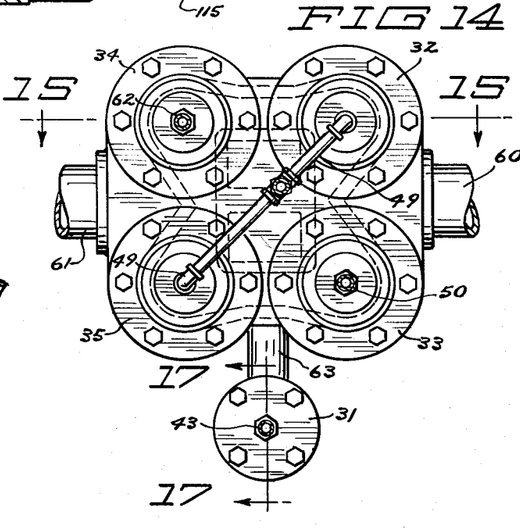
Fig. 14 is an enlarged top plan view of the grinder valve of Fig. 13 taken on line 14—14 in that figure.

Flow pipes, control pipes, passageways and conduits from the grinder valve 30 are indicated diagrammatically on Figs. 1, 2 and 3 of the drawings. Attention is directed to the fact that although it is necessary to show exhaust flow pipe 61 as two separate pipes in the diagrammatic views of Figs. 1, 2 and 3; it is actually only one pipe as will be seen by examination of Figs. 13, 14 and 15.

Figure 5:
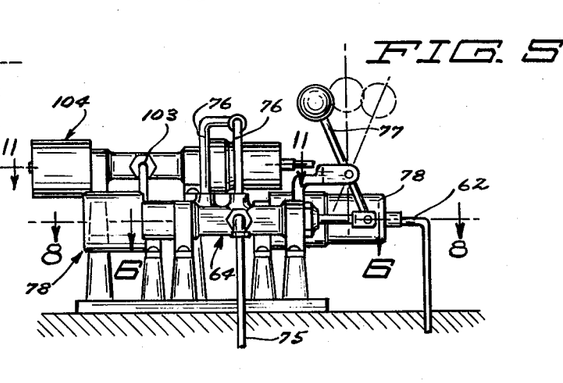
Fig. 5 is a side elevational view of the operating stand and control valves of Fig. 4.
Figure 6:
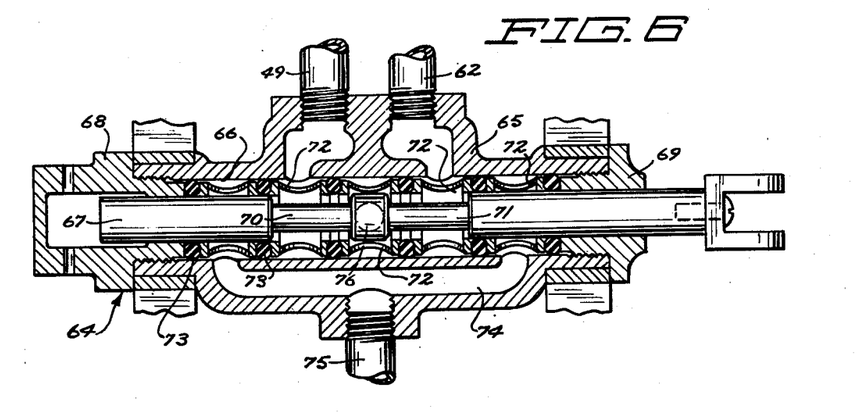
Fig. 6 is an enlarged horizontal sectional view of a manually operated pilot valve taken on line 6—6 in Fig. 5 and showing the parts in a transitory neutral position.
Figure 7:
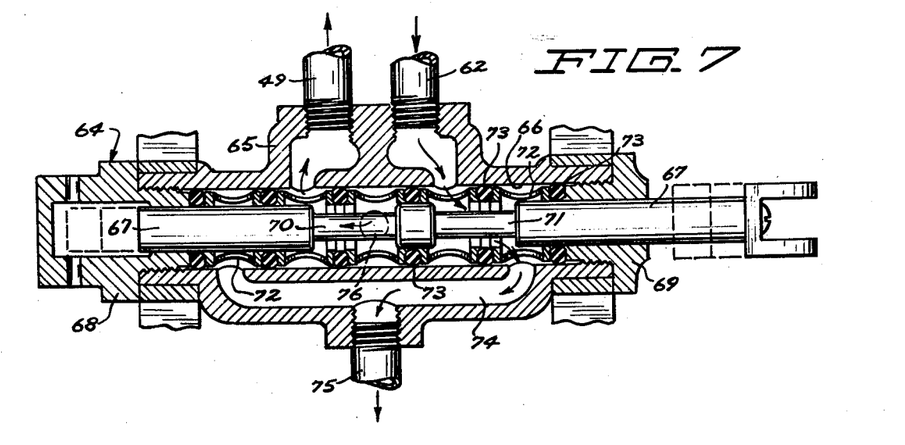
Fig. 7 is an enlarged horizontal sectional view taken on line 6—6 in Fig. 5 but showing the parts in the "moving-up" position.

A manually operated pilot valve 64 includes a casting 65 having a cylindrical opening 66 extending longitudinally therethrough. A cylindrical valve stem 67 is slidably mounted to be concentric with said cylindrical opening 66 in end bearings 68 and 69. Two portions 70 and 71 of the valve stem are reduced in diameter. Five spacers 72 are situated in the cylindrical opening 66 between the end bearings 68 and 69 and are separated from these bearings and from each other by six seal rings 73. Each of the spacers 72 is perforated to allow passage of fluid therethrough. A passageway 74 is open from positions adjacent each of the outer spacers to an exhaust or drain pipe 75. The control pipe 49 is open through the casting 65 to a spacer 72 left of the center spacer as seen in Figs. 6 and 7. Control pipe 62 is open through said casting to the spacer 72 to the right of center as seen in Figs. 6 and 7. A control pressure supply pipe 76 leads from a source of liquid under pressure (not shown) through the casting 65 to the center spacer 72. In the disclosed embodiment of the invention this source is the screened full pressure supply used to supply the governor which regulates the grinding pressure fed to pipe 42. Seal rings 73 form a liquid tight seal with the unreduced portions of the valve stem 67. A control handle 77 is pivotally mounted with respect to the castings 65 of the pilot valve 64 and with respect to the valve stem 67 as best seen in Fig. 5.

Figure 8:
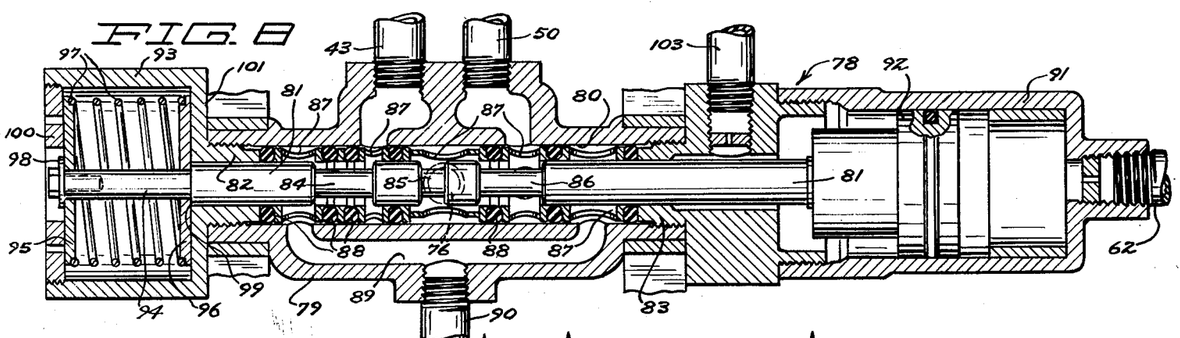
Fig. 8 is an enlarged horizontal sectional view taken on line 8—8 in Fig. 5 showing a three position grinder control valve with parts in the grinding position.
Figure 9:
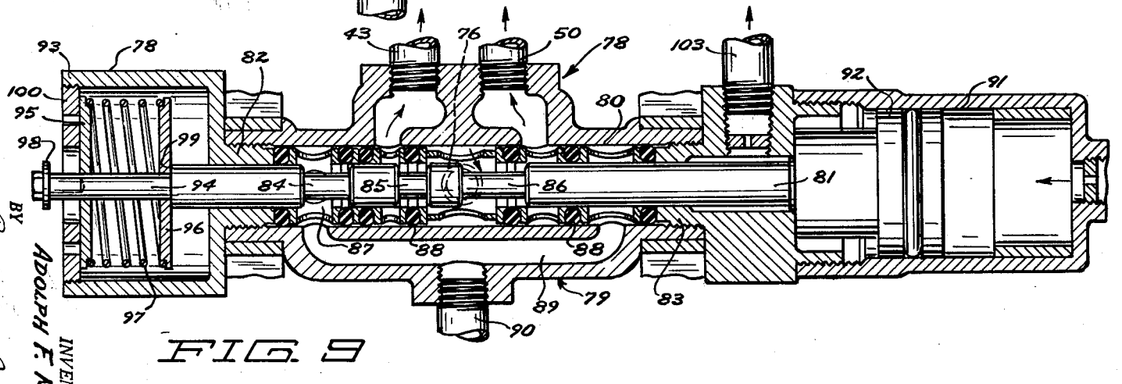
Fig. 9 is a view of the grinder control valve as seen in Fig. 8 with parts disclosed in the "backing off" position.
Figure 10:
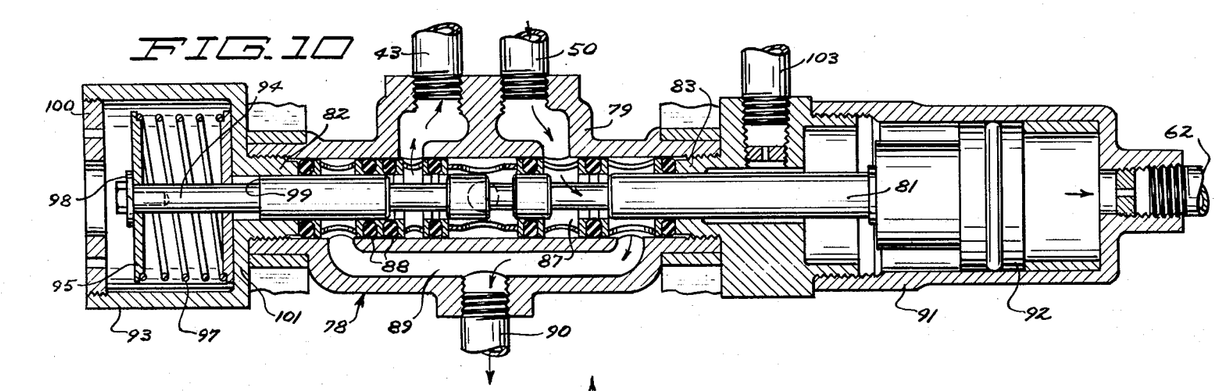
Fig. 10 is a view of the grinder control valve as seen in Fig. 8 with parts disclosed in the "moving up" position.

A three position grinder control valve 78 includes a casting 79 having a cylindrical opening 80 extending longitudinally therethrough. A cylindrical valve stem 81 is slidably mounted to be concentric with said cylindrical opening 80 in end bearings 82 and 83. Three portions 84, 85 and 86 of the valve stem are reduced in diameter. Five spacers 87 are situated in the cylindrical opening 80 between the end bearings 82 and 83 and are separated from each other and from said end bearings by a plurality of seal rings 88. Each of the spacers 87 is perforated to allow passage of fluid therethrough. A passageway 89 is open from positions adjacent each of the outer spacers to an exhaust or drain pipe 90. The control pipe 43 is open through the casting 79 to a spacer 87 left of the center spacer as seen in Figs. 8, 9 and 10. The control pipe 50 is open through said casting to a spacer 87 to the right of the center spacer as seen in Figs. 8, 9 and 10. The control pressure supply pipe 76 is open through the casting 79 to the center spacer 87. Seal rings 88 form a liquid tight seal with the unreduced portions of the valve stem 81. A grinder control valve cylinder 91 is fixedly mounted on one end of the casting 79 to be concentric with the valve stem 81. A grinder control valve piston 92 is operably mounted in the cylinder 91 and it is connected to the valve stem 81. The control pipe 62 opens to the interior of the cylinder 91 at a side of the piston 92 opposite the valve stem 81. A control pipe 103 is open to the interior of the cylinder 91 at a side of the piston 92 adjacent said stem 81. A spring housing 93 is mounted at a second end of the casting 79 to be concentric with the valve stem 81. A spring guide rod 94 is constituted as an integral extension of and extends outwardly from the valve stem 81 into the spring housing 93. A pair of spring retaining plates 95 and 96 are slidably mounted on the guide rod 94. A compression coil spring 97 bears outwardly against each of the spring retaining plates. The left spring retaining plate 95 as seen in Fig. 8 is limited in its outward movement by washer 98 which is fixed in relationship to the guide rod 94, while the right spring retaining plate 96 is limited in its movement away from the spring 97 by shoulder 99. An end wall 100 of the spring housing 93 also serves to limit the outward movement of the spring retaining plate 95 while a second end wall 101 similarly limits the movement of the plate 96.

Figure 11:
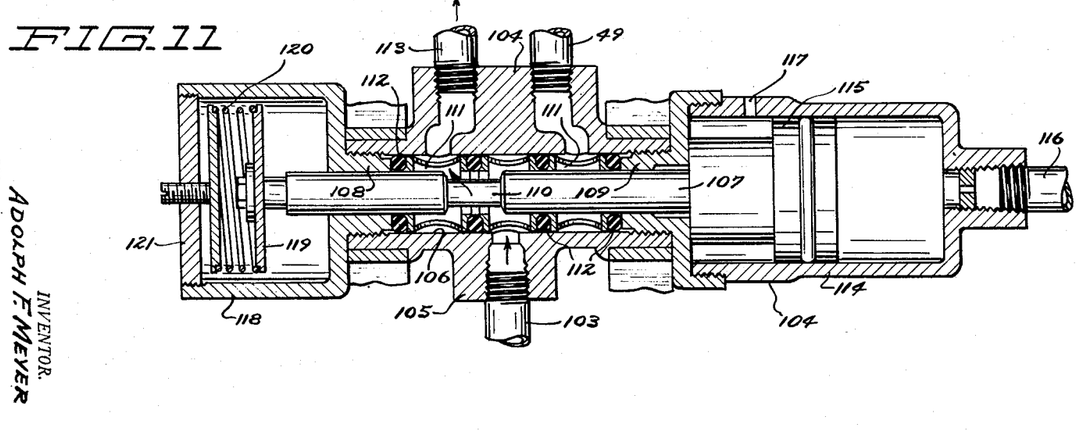
Fig. 11 is an enlarged horizontal sectional view taken on line 11—11 in Fig. 5 of a two position intermediate control valve showing parts in the grinding position.
Figure 12:
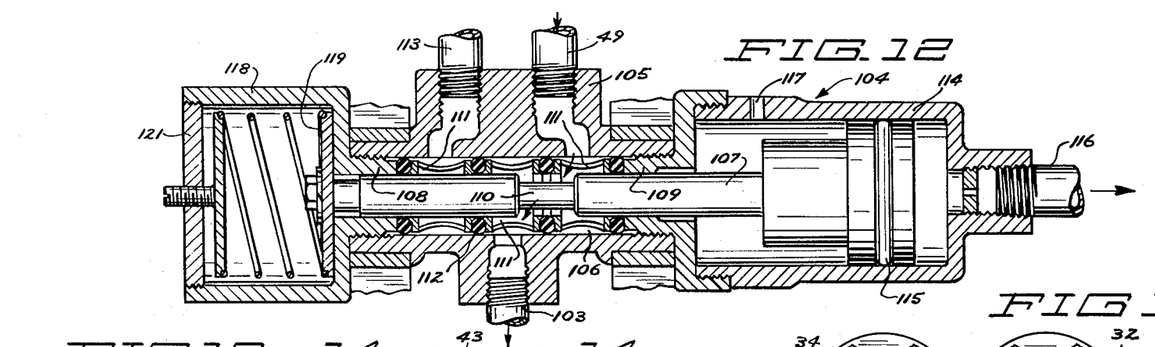
Fig. 12 is a view of the intermediate control valve as seen in Fig. 11 showing parts in the "moving up" position.

A two position intermediate control valve 104 includes a casting 105 having a cylindrical opening 106 extending longitudinally therethrough. A cylindrical valve stem 107 is slidably mounted in end bearings 108 and 109 to be concentric with said cylindrical opening 106. A portion 110 of the valve stem is reduced in diameter. Three spacers 111 are situated in the cylindrical opening 106 between end bearings 108 and 109 and are separated from each other and from said end bearings by four seal rings 112. Each of the spacers 111 is perforated to allow passages of fluid therethrough. The control pipe 49 is open through the casting 105 to position adjacent a spacer 111 to the right of the other spacers as seen in Figs. 11 and 12. A drain or exhaust pipe 113 is open through the casting 105 to a spacer 111 to the left as seen in Figs. 11 and 12. The control pipe 103 is open through the casting to the center spacer 111. Seal rings 112 form a liquid tight seal with the unreduced portions of the valve stem 107. An intermediate control valve cylinder 114 is fixedly mounted on one end of the casting 105 to be concentric with the valve stem 107. An intermediate control valve piston 115 is operably mounted in the cylinder 114 and is connected to the valve stem 107. A pressure transmitting pipe 116 is open from the interior of the cylinder 28 at a side of the hydraulic piston 29 opposite the ram rod 27 to the interior of the intermediate control valve cylinder 114 at a side of said piston 115 opposite said valve stem 107. A passageway 117 is provided from the inside of the intermediate control valve cylinder 114 at a side of the piston 115 adjacent valve stem 107 to the atmosphere. A spring housing 118 is mounted at a second end of the casting 105 to be concentric with the valve stem 107. A spring pressure plate 119 is fixedly mounted on an end of the valve stem 107 opposite said intermediate control valve piston 115. A compression coil spring 120 bears against the spring pressure plate 119 and against an outer wall 121 of the spring housing 118.

A manually operated gate valve 122 is located in control pipe 49 at position immediately adjacent intermediate control valve 104.

*Operation*

When the grinder is in operation to grind wood into pulp, the grinder control system and apparatus parts will be positioned as illustrated diagrammatically in Fig. 1. The control handle 77 of the manually operated pilot valve 64 will be positioned as seen in Fig. 5 and the various internal parts of this pilot valve will be positioned as seen in Fig. 7. The source furnishing fluid under pressure to the control pressure supply pipe 76 is preferably the screened full supply pressure used to supply the hydraulically operated governor which governor regulates the grinding pressure fed to the flow pipe 42. This full supply pressure enters the pilot valve 64 from pipe 76 at the location of the center spacer 72 of that pilot valve and passes along the reduced portion 70 of the valve stem 67 and enters the control pipe 49. This pipe 49 transmits the pressure into the control chambers of valves 32 and 35 respectively. This causes the diaphragms of these valves to be depressed and brings the valve shoes thereof in sealing relation to the valve ports. In Fig. 15, valve 32 is illustrated in this position. Since valve port 47 is sealed shut, the fluid under the fast-travel pressure in flow pipe 60 and flow chamber 46 is prevented from entering passageway 56, conduit 57 or the cylinder 28 at the backing-off side of the piston 29. Since the valve port of the valve 35 is sealed, there is no opening from the cylinder 28 at the moving-up and grinding side of the piston 29 to the exhaust pipe 61.

With the grinder in operation and with the grinding pressure operative on the "moving-up" side of the piston 29 in the cylinder 28, this pressure will be transmitted along pressure transmitting pipe 116 into the intermediate control valve cylinder 114. This pressure will force the intermediate control valve piston 115 to take position at the left end of the cylinder and to position the various parts of the intermediate control valve 104 as shown in Fig. 11. Full supply pressure in control pipe 49 is cut off by valve stem 107 of the valve 104. Control pipe 103 is open to spacers 111 and along reduced portion 110 of valve stem 107 to exhaust pipe 113. Similarly, in the pilot valve 64, the control pipe 62 is open through spacers 72 and reduced portion 71 of the valve stem 67 to the exhaust pipe 75. Consequently, there will be no pressure exerted on either side of the piston 92 of the grinder control valve 78 and the parts of this valve will be positioned as seen in Fig. 8. That is, compression coil spring 97, bearing against spring retaining plates 95 and 96 will hold valve stem 81 in its center position. In this position, the control pressure supply pipe 76 is open through spacers 87 and the reduced portion 86 of the valve stem 81 of the grinder control valve 78 to control pipe 50. This introduces the full supply pressure into the control chamber of the valve 33 and causes the valve port of this valve 33 to be sealed, thus preventing the grinding pressure in the conduit 59 and passageway 58 from opening into the flow chamber of the valve 33 which contains the fast travel pressure supplied by the flow pipe 60. Because control pipe 43 is open through spacers 87 and the reduced portion 84 of the valve stem 81 to passageway 89 and drain or exhaust pipe 90, there is no pressure in the control chamber 37 of the valve 31. The various parts of valve 31 are positioned as seen in Fig. 17 and the regulated grinding pressure can pass along flow pipe 42, through the valve port 39 and flow chamber 38 to passageway 63, passageway 58 and conduit 59 into cylinder 28 on the moving up side of hydraulic piston 29. Since, as explained, control pipe 62 is open to drain, there is no pressure in control chamber 52 of the valve 34 and fluid being expelled out of the cylinder 28 on the backing off side of hydraulic piston 29 will pass through conduit 57, a passageway 56, through valve port 54 and flow chamber 53 out the exhaust pipe 61. This positioning of the parts of valve 34 is shown in Fig. 15.

When it is desired to replenish the wood supply in the pocket 23, the control handle 77 of the pilot valve 64 is moved from the position shown in full in Fig. 5 to a backing off position. As the handle moves toward that position, the knob thereon passes an intermediate transient position shown by the dotted circle bisected by the broken vertical line in Fig. 5. The positioning of the parts inside of the pilot valve 64 corresponding to this transient positioning of the control handle is shown in Fig. 6. As indicated in this figure, the opening from the exhaust pipe 75 through the passageway 74 and the outer spaces 72 to the remainder of the spacers is blocked by the seal rings 73 and the valve stem 67. The control pressure supply pipe 76 is, at this point open to both control pipe 49 through reduced portion 70 of the valve stem 67 and control pipe 62 through reduced portion 71 of the valve stem. While the valve stem does not stop in this position, the fact that the exhaust pipe 75 is blocked off and that the full supply pressure is open to both pipes 49 and 62 at the same time means that all of the valves 31, 32, 33, 34 and 35 will have pressure in their control chambers and will be shut off during transition of the manually operated pilot valve between grinding and backing off position. Pressure in control pipe 49 is exerted in the control chambers of valves 32 and 35 to close the valve ports thereof. Pressure in control pipe 62 is exerted in the control chamber 52 of the valve 34 to close valve port 54 of that valve, and is exerted in the grinder control valve piston 91 of the grinder control valve 78 to cause the piston 92 to move to the left to have position as seen in Fig. 9. With the parts as shown in Fig. 9, there is a passageway from the control pressure supply pipe 76 through the casting 79 and reduced portion 86 of the valve stem 81 to the control pipe 50. There is also a passage through the reduced portion 85 through the valve stem to the control pipe 43 from the pipe 76. Control pressure is thereby exerted in the control chambers of valve 31 and the valve 33 and causes the ports of these valves to be closed. This closing of these five valves prevents any surges of liquid which would occur should the regulated grinding pressure, fast-travel pressure and exhaust pipes ever be open to each other.

When the control handle 77 and the stem of the pilot valve 64 have completed the trip to the backing off position, there will be an opening between the control pipe 49, along the reduced portion 70 of the valve stem to the passageway 74 and the exhaust pipe 75. This will remove the pressure from the control chambers of valves 32 and 35 so that these valves can open. There will still be an opening between the control pipe 62 and the control pressure supply pipe 76 along the reduced portion 71 of the valve stem.

With the opening of the valve 35 to connect the portion of the cylinder 28 opposite the ram rod 27 to the flow pipe 61 to exhaust or drain, pressure in the pressure transmitting pipe 116 will fall to atmospheric when the piston 29 reaches the end of its stroke and intermediate control valve piston 115 will be moved from the position as shown in Fig. 11 to the position as shown in Fig. 12 due to the action of the spring 120 on the pressure plate 119. With the valve stem of the intermediate control valve 104 positioned as shown in Fig. 12, there is a passage from control pipe 103 through the casting 105 and the reduced portion 110 of the valve stem 107 to pipe 49, and through gate valve 122 and pilot valve 64 to drain. With the removal of the control pressure in the control chamber 45 of the valve 32, the fast-travel pressure in flow pipe 60 will lift the diaphragm 44 and the valve shoe 48 away from the valve port 47 and liquid under this fast-travel pressure will flow through the valve port 47, passageway 56 and conduit 57 to enter the cylinder 28 at a side of the piston 29 adjacent the ram rod 27. This liquid under fast-travel pressure will cause the piston 29, the ram rod, and the ram 26 to move rapidly away from the grinding wheel 20. As this happens, the liquid on the other side of the piston 29 will be expelled from the cylinder 28 through the conduit 59, and the passageway 58, the valve port of the valve 35, and out the flow pipe 61 to exhaust or drain. When the ram rod 26 clears the door 25 of the wood bin 24, the door will be opened, a new supply of wood will drop into the pocket 23 and the sliding door 25 will be closed.

In order to cause the ram 26 to move rapidly toward the grinding wheel 20 so that the grinding operation can commence with a minimum of delay, the control handle 77 of the manually operated pilot valve 64 is moved from the backing-off to the grinding position. As previously explained, the action of the pilot valve will be such that control pressure from the pipe 76 will be applied along the pipe 49 before the control pressure is removed from the pipe 62 in order that all of the five valves of the grinder valve assembly 30 will be closed before any become open. Pressure in the control pipe 49 is applied to the control chambers of valves 32 and 35 so that they will close. This pressure in pipe 49 also is applied through the gate valve 122 and casting 105 of the intermediate control valve 104 and through the reduced portion 110 of the valve stem 107 of that valve to control pipe 103. This exerts the control pressure into the cylinder 91 on the side of the piston 92 adjacent the valve stem 81 and tends to force this piston 92 to move to the right end of the cylinder as shown in Fig. 10. With the parts of the pilot valve 64 in grinding position as seen in Fig. 7, as previously explained, control pipe 62 is open through the pilot valve to drain pipe 75. This relieves the pressure in the right end of grinder control valve cylinder 91 and the piston 92 will move to position as seen in Fig. 10. With the valve stem in position as seen in this figure, there is an opening from control pipe 50 and through the casting 79 of the grinder control valve 78 and the reduced portion 86 of the valve stem of that valve to passageway 89 and along exhaust or drain pipe 90 to drain. This removes the control pressure from the control chamber of the valve 33 and allows the fast-travel pressure in the flow pipe 60 to be exerted through the valve 33 and passageway 58, conduit 59 into that portion of the cylinder 28 at a side of the piston 29 opposite the ram rod 27.

With control pipe 62 open to drain, the control pressure chamber 52 of the valve 34 is no longer subjected to the control pressure and so the liquid in that part of the cylinder 28 on the side of the piston 29 adjacent the ram rod will be forced by the piston 29 out through the conduit 57, the passageway 56 through the valve 34 and into flow pipe 61 to drain.

As long as the ram 26 is pushing the supply of wood ahead of it toward the grinding wheel 20 and until the wood is forced by the ram against the wheel, the flow of liquid into the cylinder will cause the piston 29 to move toward the grinding wheel rapidly. Until the wood is tightly confined by the ram in the pocket, the pressure inside of the cylinder 28 causing the piston to move will not build up to the full value of the fast-travel pressure available in the flow pipe 60 because of the friction losses along the pipe 60, through the valve 33, the passageway 58 and the conduit 59. When the wood is confined and the piston meets resistance and as the grinding action begins to take place, the pressure in the cylinder will begin to build up. The strength of the spring 120 and the tension which it is under is such that as the back pressure in the cylinder 28 approaches the regulated grinding pressure, and is transmitted along the pressure transmitting pipe 116 to the right side of intermediate control valve cylinder 114 as seen in Fig. 11, the intermediate control valve piston 115 will move to the left against the action of coil spring 120 to position as seen in that figure. With the valve stem 107 in that position, there is a passage from control pipe 103 through the reduced portion 110 of said valve stem to drain pipe 75. This relieves the pressure in the left end of the grinder control valve cylinder 91 and causes the parts of that valve to take the balanced position shown in Fig. 8. As previously explained, this connects the control pressure from control pressure supply pipe 76 through reduced portion 86 of valve stem 81 of the grinder control valve 78 to control pipe 50 to cause the control pressure to be exerted in the control chamber of the valve 33. This closes the valve port of the valve 33. At the same time, the control pipe 43 is connected through the reduced portion 84 of the valve stem 86 of the grinder control valve to the drain pipe 90 and the control pressure is thereby removed from the control chamber 37 of valve 31. This allows the regulated grinding pressure to be applied through flow pipe 42 and valve port 39 of said valve 31 to that portion of the cylinder 28 at a side of the piston 29 spaced from the ram rod 27. This is the normal grinding position of the apparatus and will be maintained as long as the pilot valve is left in the grinding position. When the wood in the pocket has been ground, the cycle will be repeated.

In putting the apparatus into operation in the first instance or after a shut down, it is desirable that gate valve 122 be closed. This prevents the control pressure in the control pipe 49 from passing through the intermediate control valve 104 to disrupt the operation of the apparatus before the pressure transmitting pipe 116 is subjected to the regulated grinding pressure. As soon as the apparatus is in operation to grind wood, and the regulated grinding pressure is present in the intermediate control valve cylinder 114, gate valve 122 can be opened.

All five of the interconnected valves 31, 32, 33, 34 and 35 are constructed so that there is a minimum resistance to flow through the flow chambers thereof. Valve 31 is typical of all of these valves in that respect. As best seen in Fig. 17, a main casting 123 of the valve 31 contains the flow chamber 38 and a replaceable nipple 124 which in turn constitutes the valve port 39. This port 39 opens into the flow chamber substantially in alinement with the axis of the passageway 63 where said passageway enters the casting 123. This positioning of the passageway 63 and the valve port 39 insures the least possible friction loss due to flow through the flow chamber of the valve. The valve shoe 40 is mounted on the flexible diaphragm 36 by means of a plate 125 and a cap screw 126. A top casting 127 of valve 31 contains the control chamber 37 and the control pipe 43 is mounted therein. Cap screws 128 extend through the top casting 127 and the flexible diaphragm 36 and secure these parts to the main casting 123. When it is necessary or desirable to replace either the flexible diaphragm 36, the valve shoe 40, or the nipple 124; the cap screws 128 and the top casting 127 are removed. The flexible diaphragm, valve shoe and nipple are then readily accessible.

Construction and arrangement of the parts is such that when there is a flow in the flow chamber, the pressure of liquid therein will raise the valve shoe out of alinement with the direct path of the flow to reduce the friction losses in the valve. Since the flexible diaphragm is situated out of the line of flow, there will be no appreciable wear on it occasioned by this flow.

What is claimed is:

1. The combination with a cylinder and a piston slidably mounted therein, of a first flow pipe for delivering fluid under pressure to said cylinder, a second flow pipe for delivering fluid under pressure to the cylinder, a valve assembly consisting of first, second, third, fourth and fifth valves, each of said five valves including a flow chamber, a control chamber, a valve port open from the interior of said flow chamber to the outside of said valve, means operative in response to pressure in said control chamber for closing said valve port in said flow chamber and a control pipe open to said control chamber, a first conduit open from the valve ports of said third and fifth valves to a first end of said cylinder, a second conduit open from the valve ports of said second and fourth valves to a second end of said cylinder, a passageway open from flow chamber of said first valve to said first conduit, said first flow pipe for delivering fluid under pressure being open from outside of first valve to said valve port of said first valve, said second flow pipe being open to said flow chambers of said second and third valves, the flow chambers of said fourth and fifth valves being open to drain, and means for selectively exerting and removing a control pressure in each of the five control pipes.

2. The combination with a cylinder and a piston operably mounted therein, of a first flow pipe for delivering fluid under pressure, a second flow pipe for delivering fluid under pressure, a valve assembly consisting of first, second, third and fourth valves, each of said four valves including a flow chamber, a control chamber, a valve port open from the interior of said flow chamber to the outside of said valve, means operative in response to pressure in said control chamber for closing said valve port in said flow chamber and a control pipe open to said control chamber, said first flow pipe being open to the valve ports of said second and fourth valves and to a first end of said cylinder, a conduit open from the valve ports of said first and third valves to a second end of said cylinder, said second flow pipe being open to the flow chambers of said first and second valves, the flow chambers of said third and fourth valves being open to drain, valve means for closing said first flow pipe, and means for selectively exerting and removing a control pressure in each of the four control pipes.

3. The combination with a main cylinder and a piston operably mounted therein; of a first conduit open to a first end of said main cylinder; a second conduit open to a second end of said main cylinder; a first flow pipe for delivering fluid under pressure from a first source of fluid under pressure; a second flow pipe for delivering fluid under pressure from a second source of fluid under pressure; a drain pipe; a control pressure supply pipe for delivering fluid under pressure from a third source of fluid under pressure; a manually operable pilot valve capable of assuming first and second positions; and means including and controlled by said pilot valve operative in response to positioning of said pilot valve in said first position and in response to pressure in said control pressure supply pipe to open said second flow pipe to said first conduit and to open said second conduit to said drain pipe, operative in response to positioning of said pilot valve in said first position, in response to pressure in said control pressure supply pipe and in response to pressure in said first end of said main cylinder to open said first flow pipe to said first conduit and to open said second conduit to said drain pipe, and operative in response to positioning of said pilot valve in said second position and in response to pressure in said control pressure supply pipe to open said first conduit to said drain pipe and to open said second conduit to said second flow pipe.

4. The combination as specified in claim 3, and said means operative in response to pressure in said pressure supply pipe to close from all others each of said first and second conduits, said first and second flow pipes and said drain pipe when said pilot valve is moved between said first and second positions.

5. The combination with a main cylinder and a piston operably mounted therein; of a grinder valve assembly including first, second, third, fourth and fifth grinder valves, each having a flow chamber, a control chamber, a valve port open to the interior of said flow chamber, and means operative in response to pressure in said control chamber for closing said valve port; a first conduit open from the valve ports of said third and fifth valves to a first end of said main cylinder; a passageway open from said flow chamber of said first valve to said first conduit; a second conduit open from the valve ports of said second and fourth valves to a second end of said cylinder; a first flow pipe for carrying fluid under pressure open to the valve port of said first valve; a second flow pipe for carrying fluid under pressure open to the flow chambers of said second and third valves; a drain pipe open to the flow chambers of said fourth and fifth valves; a grinder control valve including a grinder control valve casting, a grinder control valve stem slidably mounted in said grinder control valve casting to have movement between said first and second positions, a grinder control valve cylinder fixedly mounted with respect to said grinder control valve casting, a grinder control valve piston operably mounted in said grinder control valve cylinder and connected to said grinder control valve stem, spring means urging said grinder control valve stem to move to an intermediate third position between said first and second positions, said grinder control valve piston being operative to move said grinder control valve stem to said first position responsive to pressure in a first end of said grinder control valve cylinder and to move said grinder control valve stem to said second position responsive to pressure in a second end of said grinder control valve cylinder; an intermediate control valve including an intermediate control valve casting, an intermediate control valve stem slidably mounted in said casting to have movement between first and second positions, an intermediate control valve cylinder fixedly mounted with respect to said intermediate control valve casting, an intermediate control valve piston operably mounted in said intermediate control valve cylinder and connected to said intermediate control valve stem, spring means urging said intermediate control valve stem to move to said second position, and said intermediate control valve piston being operative to move said intermediate control valve stem to said first position responsive to pressure in a first end of said intermediate control valve cylinder; a pilot valve including a pilot valve casting and a pilot valve stem slidably mounted in said pilot valve casting to have movement between first and second positions; a pressure transmitting pipe open from said first end of said intermediate control valve cylinder to said first end of said main cylinder; a control pressure supply pipe for delivering fluid under pressure open to said pilot valve and to said grinder control valve; a first control pipe open between said pilot valve, said control chamber of said second grinder valve and said intermediate control valve; a second control pipe open between said pilot valve, said control chamber of said fourth grinder valve and said first end of said grinder control valve cylinder; a third control pipe open between said grinder control valve and the control chamber of said third grinder valve; a fourth control pipe open between said grinder control valve and said control chamber of said first grinder valve; a fifth control pipe open between said intermediate control valve and said second end of said grinder control valve cylinder; means in said pilot valve for opening said control pressure supply pipe to said first control pipe and for opening said second supply pipe to drain when said pilot valve stem is in said first position, and for opening said control pressure supply to said second control pipe and for opening said first control pipe to drain when said pilot valve stem is in said second position; means in said intermediate control valve for opening said fifth control pipe to drain when said intermediate control valve stem is in said first position, and for opening said first control valve to said fifth control valve when said intermediate control valve stem is in said second position; and means in said grinder control valve for opening said control pressure supply pipe to said third and fourth control pipes when said grinder control valve stem is in said first position, for opening said control pressure supply pipe to said fourth control pipe and for opening said third control pipe to drain when said grinder control valve stem is in said second position, and for opening said control pressure supply pipe to said third control pipe and for opening said fourth control pipe to drain when said grinder control valve stem is in said third position.

6. The combination as specified in claim 5, and a gate valve in said first control pipe adjacent said intermediate control valve.

7. The combination as specified in claim 5, and means in said pilot valve for opening said control pressure supply pipe to said first and second control pipes when said pilot valve stem is in an intermediate third position between said first and second positions.

8. The combination as specified in claim 6, and means in said pilot valve for opening said control pressure supply pipe to said first and second control pipes when said pilot valve stem is in an intermediate third position between said first and second positions.

9. A valve assembly comprising first, second, third, fourth and fifth valves, each of said five valves including a flow chamber, a control chamber, a valve port open to the interior of said flow chamber, means operative in response to pressure in said control chamber for closing said valve port and a control pipe open to the interior of said control chamber, a first conduit open to the valve ports of said third and fifth valves, a second conduit open to the valve ports of said second and fourth valves, a passageway open from said flow chamber of said first valve to said first conduit, a first flow pipe open to the valve port of said first valve, a second flow pipe open to the flow chambers of said second and third valves, and a drain pipe open to the flow chambers of said fourth and fifth valves.

10. A valve assembly comprising first, second, third, and fourth valves, each of said four valves including a flow chamber, a control chamber, a valve port open from the interior of said flow chamber to the outside of said valve, means operative in response to pressure in said control chamber for closing said valve port in said flow chamber and a control pipe open to said control chamber, a first conduit open from the valve ports of said second and fourth valves to the outside of said valve assembly, a second conduit open from the valve ports of said first and third valves to the outside of said valve assembly, a flow pipe open to the flow chambers of said first and second valves, and a drain pipe open to the flow chambers of said third and fourth valves.

11. The combination with a cylinder and a piston slidably mounted therein, of a first flow pipe for delivering fluid under pressure to said cylinder, a second flow pipe for delivering fluid under pressure to said cylinder, a valve assembly consisting of first, second, third, fourth and fifth valves, each of said five valves including a flow chamber, a control chamber, a valve port open from the interior of said flow chamber to the outside of said valve, means operative in response to pressure in said control chamber for closing said valve port in said flow chamber and a control pipe open to said control chamber, a first conduit open from the valve port of said third valve to a first end of said cylinder, a second conduit open from the valve port of said fifth valve to said first end of said cylinder, a third conduit open from the valve port of said second valve to a second end of said cylinder, a fourth conduit open from the valve port of said fourth valve to said second end of said cylinder, a passageway open from the flow chamber of said first valve to said first end of said cylinder, said first flow pipe for delivering fluid under pressure being open from outside of said first valve to said valve port of said first valve, said second flow pipe being open to said flow chambers of said second and third valves, the flow chambers of said fourth and fifth valves being open to drain, and means for selectively exerting and removing a control pressure in each of the five control pipes.

12. The combination with a cylinder and a piston operably mounted therein, of a first flow pipe for delivering fluid under pressure, a second flow pipe for delivering fluid under pressure, a valve assembly consisting of first, second, third and fourth valves, each of said four valves including a flow chamber, a control chamber, a valve port open from the interior of said flow chamber to the outside of said valve, means operative in response to pressure in said control chamber for closing said valve port in said flow chamber and a control pipe open to said control chamber, said first flow pipe being open to the valve ports of said second and fourth valves and to a first end of said cylinder, a first conduit open from the valve port of said first valve to a second end of said cylinder, a second conduit open from the valve port of said third valve to said second end of said cylinder, said second flow pipe being open to the flow chambers of said first and second valves, the flow chambers of said third and fourth valves being open to drain, valve means for closing said first flow pipe, and means for selectively exerting and removing a control pressure in each of the four control pipes.

References Cited in the file of this patent

UNITED STATES PATENTS

| | | |
|---|---|---|
| 1,781,369 | Davis | Nov. 11, 1930 |
| 1,939,150 | Terry | Dec. 12, 1933 |
| 2,351,317 | Camerota | June 13, 1944 |
| 2,356,366 | Wise | Aug. 22, 1944 |
| 2,375,946 | Reichelt | May 15, 1945 |
| 2,645,450 | Chessman | July 14, 1953 |
| 2,661,182 | Kipp | Dec. 1, 1953 |